US007361621B2

(12) United States Patent
Yang et al.

(10) Patent No.: US 7,361,621 B2
(45) Date of Patent: Apr. 22, 2008

(54) MAGNESIUM HALIDE/ALCOHOL ADDUCT, ITS PREPARATION AND USE

(75) Inventors: Yuanyi Yang, Beijing (CN); Zhenhu Li, Beijing (CN); Hongbin Du, Beijing (CN); Zhiwu Wang, Beijing (CN); Zhong Tan, Beijing (CN); Tianyi Li, Beijing (CN); Qi Chen, Beijing (CN); Wei Chen, Beijing (CN)

(73) Assignees: China Petroleum & Chemical Corp., Beijing (CN); Beijing Research Institute of Chemical Industry, Beijing (CN)

( * ) Notice: Subject to any disclaimer, the term of this patent is extended or adjusted under 35 U.S.C. 154(b) by 179 days.

(21) Appl. No.: 10/913,291

(22) Filed: Aug. 6, 2004

(65) Prior Publication Data

US 2005/0209097 A1 Sep. 22, 2005

(30) Foreign Application Priority Data

Aug. 8, 2003 (CN) ................................ 03 1 53152

(51) Int. Cl.
*C08F 4/44* (2006.01)
*C08F 10/00* (2006.01)
*B01J 31/00* (2006.01)

(52) U.S. Cl. ...................... 502/103; 502/115; 502/118; 502/172

(58) Field of Classification Search ................ 502/169, 502/172, 103, 118, 669, 672, 115; 423/497, 423/498, 592.1, 635, 636

See application file for complete search history.

(56) References Cited

U.S. PATENT DOCUMENTS 4,311,570 A * 1/1982 Cowen et al. ......... 204/157.41
4,399,054 A 8/1983 Ferraris et al.
4,421,674 A 12/1983 Invernizzi et al.
4,469,648 A 9/1984 Ferraris et al.
5,100,849 A 3/1992 Miya et al.
6,020,279 A 2/2000 Uwai et al.
6,127,304 A 10/2000 Sacchetti et al.
6,323,152 B1 11/2001 Sacchetti et al.
6,407,028 B1 6/2002 Sacchetti et al.
6,437,061 B1 8/2002 Sacchetti et al.
2002/0086794 A1 7/2002 Sacchetti et al.
2004/0009869 A1* 1/2004 Wagner et al. .............. 502/103
2004/0010101 A1* 1/2004 Wagner et al. ........... 526/124.3

FOREIGN PATENT DOCUMENTS

CN 1428189 7/2003
WO 87/07620 12/1987
WO 93/11166 6/1993

* cited by examiner

*Primary Examiner*—Michael Marcheschi
(74) *Attorney, Agent, or Firm*—Ladas and Parry LLP

(57) ABSTRACT

The present invention provides a process for preparing particles of magnesium halide/alcohol adduct, said process comprising: preparing a melt of magnesium halide/alcohol adduct in an inert liquid medium, dispersing the mixture of the inert liquid medium and the melt of the magnesium halide/alcohol adduct by high-speed rotation under a high-gravity field to obtain a dispersion of magnesium halide/alcohol adduct melt; and the cooling the dispersion of the melt to form the particles of magnesium halide/alcohol adduct. The present invention further relates to the particles of magnesium halide/alcohol adduct prepared by the process of the present invention and the use thereof in the preparation of catalysts for olefin polymerization.

12 Claims, 1 Drawing Sheet

1
2
3
4

MAGNESIUM HALIDE/ALCOHOL ADDUCT, ITS PREPARATION AND USE

CROSS REFERENCE OF RELATED APPLICATION

The present application claims priority CN03153152.0, filed on Aug. 8, 2003, which is incorporated herein by reference in its entirety and for all purposes.

TECHNICAL FIELD OF THE INVENTION

The present invention relates to a process for preparing particles of magnesium halide/alcohol adduct, the particles of magnesium halide/alcohol adduct prepared by said process and use thereof, more specifically to a novel process for preparing particles of magnesium halide/alcohol adduct by a high-gravity rotary bed, the particles of magnesium halide/alcohol adduct prepared by said process and use of said particles in the preparation of catalysts for olefin polymerization.

BACKGROUND OF THE INVENTION

Magnesium dichloride/alcohol adduct and use of particles of magnesium dichloride/alcohol adduct as carrier in the preparation of catalysts for olefin polymerization are well known in the art. The known processes for preparing particles of magnesium dichloride/alcohol adduct include spray drying process, spray cooling process, high-pressure extruding process, high-speed stirring process, etc.

For example, U.S. Pat. No. 4,421,674 discloses a spray drying process for preparing particles of magnesium dichloride/alcohol adduct, comprising preparing a solution of magnesium dichloride in ethanol, then spray drying said solution to obtain spheric particles of magnesium dichloride/alcohol adduct. The particles of magnesium dichloride/alcohol adduct prepared by this process have a relatively small particle size, with more than 90% of particles having a diameter between 5 and 10 μm. Because a solution is required, a great amount of ethanol is needed, and the energy consumption for spray drying is relatively high.

WO 8707620, WO 9311166, U.S. Pat. Nos. 5,100,849 and 6,020,279 all disclose a spray cooling process for preparing particles of magnesium dichloride/alcohol adduct, comprising spray cooling a melt of magnesium dichloride/alcohol adduct having a molar ratio of alcohol to magnesium of from 3 to 6, to obtain spheric particles of magnesium dichloride/alcohol adduct. The drawbacks of said process lie in the difficulty for controlling process conditions.

U.S. Pat. No. 4,469,648 discloses a high-pressure extruding process for making particles of magnesium dichloride/alcohol adduct, said process using kerosene, liquid paraffin, while oil etc. having a low viscosity as reaction medium, and comprising the steps of heating the reaction system to a temperature of 120-130° C. and holding for a period of time, charging high-purity nitrogen gas into the reactor so that the pressure in the reactor reaches 10-15 atm, then discharging the mixture of the melt of magnesium dichloride/alcohol adduct and the reaction medium, through an outlet pipe having a length of 3-10 m and a inner diameter of 1-2 mm, into a cooling medium, wherein the flow speed of the mixture in the pipe is about 4-7 m/s. The formed solid particles after cooling is collected, washed and dried to obtain the particles of magnesium dichloride/alcohol adduct. The process applies relatively high requirement s to the apparatus, and the morphology of the obtained particles of magnesium dichloride/alcohol adduct is not so good.

U.S. Pat. Nos. 4,399,054, 6,127,304 and 6,323,152 all disclose a high-speed stirring process for preparing particles of magnesium dichloride/alcohol adduct, comprising dispersing a molten magnesium dichloride/alcohol adduct in form of droplets into an inert medium with a certain viscosity by high-speed stirring, then discharging the mixture at a certain flow speed into a cooling medium, which is pre-cooled to a low temperature, under stirring to solidify the melt by cooling, thereby obtaining spheric particles of magnesium dichloride/alcohol adduct. This process is simple, but still suffers from relatively large particle size and broad particle size distribution.

Thus, it is still in need to provide a process for simply and readily preparing particles of magnesium dichloride/alcohol adduct, with the particle size distribution of the obtained particles of magnesium dichloride/alcohol adduct being narrow and the particle size being readily controlled.

SUMMARY OF THE INVENTION

One object of the present invention is to provide a process for preparing particles of magnesium dichloride/alcohol adduct.

Another object of the present invention is to provide particles of magnesium dichloride/alcohol adduct prepared by the process of the present invention.

Still another object of the present invention is to provide the use of the particles of magnesium dichloride/alcohol adduct of the present invention in the preparation of catalysts for olefin polymerization.

DETAILED DESCRIPTION OF THE INVENTION

Figure 1:
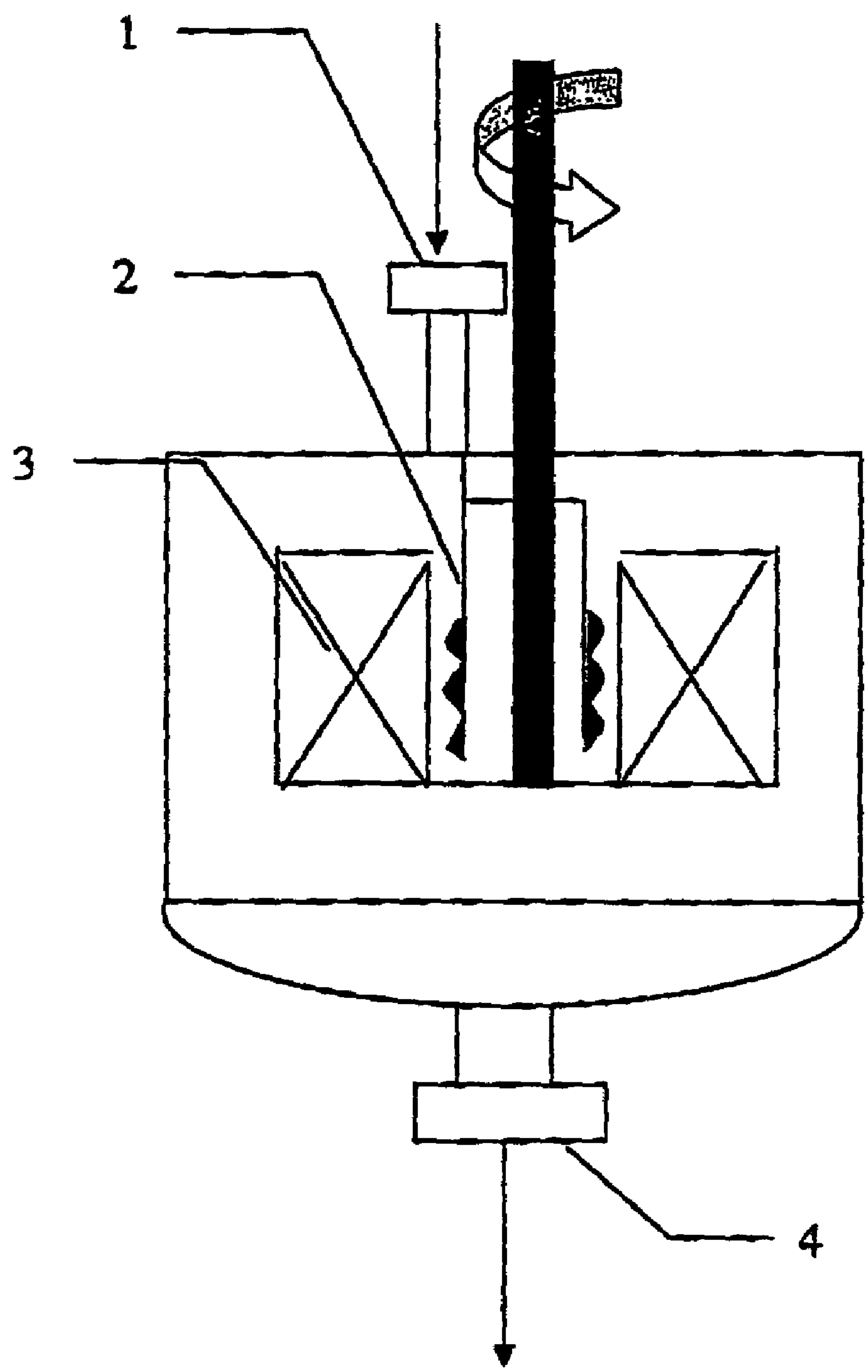
FIG. 1 is a schematic diagram of a high-gravity rotary bed useful in the present invention.

In the first aspect, the present invention provides a process for preparing particles of magnesium halide/alcohol adduct, said process comprising the steps of:

(1) in an inert liquid medium, contacting a magnesium halide with an alcohol to prepare a melt of magnesium halide/alcohol adduct;

(2) dispersing the mixture of the inert liquid medium and the melt of magnesium halide/alcohol adduct prepared in step (1) by rotation under a high-gravity field to obtain a dispersion of the melt of magnesium halide/alcohol adduct; and (3) cooling the dispersion of the melt prepared in step (2) to form the particles of magnesium halide/alcohol adduct.

In the process, the magnesium halide contacts and reacts with the alcohol generally in a reactor with a sirrer. Suitable magnesium halide is represented by a formula of $Mg(OR^1)_{2-m}X_m$, in which $R^1$ is $C_1$-$C_{14}$ hydrocarbyl, preferably linear, branched or cyclic alkyl, X is selected from the group consisting of F, Cl, Br and mixture thereof, and m is 1 or 2. Examples of magnesium halide include, but are not limited to, magnesium dichloride, magnesium dibromide, phenoxymagnesium chloride, isopropoxymagnesium chloride, butoxymagnesium chloride, with magnesium dichloride being preferred. These magnesium halides can be used either alone or in combination.

Suitable alcohol is represented by a formula of $R^2OH$, in which $R^2$ is alkyl, cycloalkyl or aryl, having from 1 to 12 carbon atoms. These alcohols can be used either alone or in combination. The preferred alcohol is at least one selected from the group consisting of methanol, ethanol, iso-propanol, n-butanol, isobutanol, iso-pentanol, n-octanol, 2-ethylhexanol, ethylene glycol, propylene glycol, chloroethanol and trichloroethanol.

Generally, the alcohol is used in an amount sufficient to ensure the obtained adduct in solid state at room temperature. The molar ratio of alcohol to magnesium halide generally varies with the type of alcohol. When methanol, ethanol, propanol, butanol, and the like are used as alcohol compound, and magnesium dichloride is used as magnesium halide, the molar ratio of alcohol to magnesium dichloride may be in a range of from 2 to 6, preferably from 2.5 to 4. A molar ratio in said ranges results in that the obtained adduct is in solid state at room temperature, but in molten state at an elevated temperature, for example, at a temperature of from 100 to 135° C.

The magnesium halide contacts and reacts with the alcohol under heating conditions. The final reaction temperature should be high enough to melt the magnesium halide/alcohol adduct. Said final reaction temperature is typically in a range of from 90 to 150° C., preferably from 110 to 140° C., and more preferably from 120 to 130° C.

The inert liquid medium used is typically liquid aliphatic hydrocarbons inert solvent, such as kerosene, liquid paraffin, vaseline oil, white oil etc., and if necessary, optionally comprises some organic silicon compounds or surfactants. The preferred inert liquid medium is white oil or a mixture of white oil and silicone oil.

In the process for preparing particles of magnesium halide/alcohol adduct according to the present invention, the mixture of the magnesium halide/alcohol adduct melt and the inert liquid medium is rotated at high speed under high-gravity field so that the adduct melt is dispersed to form uniform liquid droplets. The process mainly makes use of the characteristic of greatly intensified mass transfer between reactants under high-gravity field. The high-gravity field can be generated by a high-gravity rotary device. Specifically, the mixture of the inert liquid medium and the magnesium halide/alcohol adduct melt can be dispersed by high-speed rotation in a high-gravity rotary bed. The basic structure of said high-gravity rotary bed is shown in FIG. 1, and the related detailed contents can be found in the Chinese Patent Application CN1428189A, "High-pressure rotary bed gas-liquid mass-transferring under a high-gravity field and reaction equipment", which is incorporated herein by reference in its entirety.

With reference to FIG. 1, the mixture of the inert liquid medium and the magnesium halide/alcohol adduct melt enters the high-gravity rotary bed via an inlet 1, and is uniformly sprayed via a static liquid distributor 2, which is located at the center of the rotator, onto the inside edge of the packing 3 rotating at a high speed. The feed stream is sheared by the packing 3 that rotates at a high speed to form fine liquid droplets, and the micro-mixing of the adduct and the inert liquid medium is intensified so that the magnesium halide/alcohol adduct melt is uniformly dispersed in the inert liquid medium in a form of liquid droplets. The stuff is then thrown out by the packing 3 that rotates at a high speed and discharged via an outlet 4, to obtain an uniform dispersion of the magnesium halide/alcohol adduct melt.

The packing in the high-gravity rotary bed can be a Sulzer packing, i.e. a corrugated gauze packing, having an average pore size of from 0.1 to 8 mm, a porosity of from 90 to 99 percent, a specific surface area of from 100 to 3000 $m^2/m^3$, and a wire diameter of from 0.05 to 0.5 mm.

The rotation speed of the high-gravity rotary bed is typically in a range of from 100 to 3000 rpm, preferably from 150 to 2500 rpm, most preferably from 500 to 2000 rpm. The dispersion effect can be readily adjusted by regulating the rotation speed.

The dispersion of the melt obtained from the high-gravity rotary bed is cooled in order to obtain the particles of magnesium halide/alcohol adduct of the present invention. In general, the stream discharged from the outlet 4 of the high-gravity rotary bed can be introduced to a cooling liquid-containing vessel equipped with a stirrer, to rapidly cool and shape the magnesium halide/alcohol adduct to obtain spheric solid particles. In general, the average particle size of said solid particles (D50) is in a range of from 10 to 150 μm, preferably from 15 to 90 μm. In the process for preparing particles of magnesium halide/alcohol adduct according to the present invention, the average particles size of the obtained spheric solid particles (D50) can be regulated by altering the rotation speed of the high-gravity rotary bed, the wire diameter and the average pore size of the used packing.

Said cooling liquid can be inert hydrocarbons compound with a lower boiling point, such as petroleum ether, raffinate oil, pentane, hexane, heptane and the like. Prior to contacting with the stuff, the cooling liquid can be controlled at a temperature of from 0 to −60° C. or lower, typically from −20 to −40° C.

Finally, the cooled spheric solid particles are filtered out, washed with a washing liquid, and then dried to obtain the product of particles of magnesium halide/alcohol adduct.

Said washing liquid can be inert hydrocarbons compound with a lower boiling point, such as petroleum ether, raffinate oil, pentane, hexane, heptane and the like. The washing temperature can be ambient temperature.

In the second aspect, the present invention provides the particles of magnesium halide/alcohol adduct prepared by the aforementioned process. Such spheric solid particles have an average particle size (D50) ranging from 10 to 150 μm, preferably from 15 to 90 μm, and said average particle size can be readily regulated. The particles are uniform, have a narrow particle size distribution, and can be used to prepare catalysts for olefin polymerization.

The average particle size and particle size distribution of said solid particles can be measured by a laser granulometer. The particle size distribution can be characterized by the ratio of (D90−D10)/D50. In the present invention, said ratio is less than or equal to 1.5, preferably less than or equal to 1.2. Since the particle size distribution of the particles of magnesium halide/alcohol adduct is relatively narrow, when said particles are used to prepare catalysts for olefin polymerization, catalysts with a narrow particle size distribution can be obtained, and this is very beneficial to prepare a polymer with a narrow particle size distribution.

Thus, in the third aspect, the present invention is to provide the use of said particles of magnesium halide/alcohol adduct in the preparation of catalysts for olefin polymerization, comprising the step of treating the particles with a titanium compound, optionally an organoaluminum compound, and optionally an electron donor compound.

The catalysts for olefin polymerization can be prepared from the particles of magnesium halide/alcohol adduct of the present invention according to techniques known in the art, such as the techniques disclosed in Chinese Patent Application No. 00109216.2.

EXAMPLES

The following examples are provided to illustrate the present invention, and are not to limit the scope of the invention in any way.

Testing Methods:

1. The average particle size and the particle size distribution of the solid particles were measured by a laser granulometer APA 5002, manufactured by Malvern Instruments Ltd., Malvern, UK.

2. The molar ratio of alcohol to magnesium dichloride in the adducts was measured by thermogravimetry, and the used thermogravimetric apparatus is PE-7, manufactured by P-E Company, U.S.A.

Example 1

Particles of magnesium halide/alcohol adduct with an average particle size (D50) of 35 μm were prepared as follows.

(1) Preparation of Magnesium Halide/Alcohol Adduct Melt:

In a 150 L reactor equipped with a stirrer, 10 kg of anhydrous magnesium dichloride and 12.6 kg of ethanol were added to 60 L of white oil having a viscosity of 30 cps at 20° C., and the mixture was allowed to react at 125° C. for 2 hours. Then the obtained mixture of molten magnesium halide/alcohol adduct and white oil was transferred into 120 L of methyl silicone oil that was preheated to 125° C. and had a viscosity of 300 cps at 20° C., and the mixture was stirred at a stirring speed of 200 rpm for 20 minutes.

(2) Dispersion:

The above mixture entered a high-gravity rotary bed (as depicted in FIG. 1) via the inlet 1, and was uniformly sprayed via a static liquid distributor 2, which was located at the center of the rotator, onto the inside edge of the packing 3 rotating at a high speed. After the feed stream was sheared and dispersed by the packing that rotated at a high speed, the magnesium dichloride/alcohol adduct melt was suspended in a form of fine liquid droplets in the inert medium, and was discharged via the outlet 4. The rotation speed of the rotator was 1500 rpm, and the packing was a Sulzer packing having a wire diameter of 0.2 mm, a porosity of 97.8%, and a specific surface area of 852 $m^2/m^3$.

(3) Solidifying by Rapid Cooling:

The mixture discharged from the outlet 4 was introduced into 1200 L of hexane, which was pre-cooled to −35° C., under stirring. The molten magnesium dichloride/alcohol adduct in the form of droplets was cooled and solidified to form spheric solid particles.

(4) Filtering, Washing and Drying:

The solid particles were filtered out from the suspension obtained after rapid cooling, washed with hexane at room temperature for five times with the amount of hexane used being 100 L per times. The washed solid particles were dried under vacuum at a temperature of 30 to 50° C. to give the spheric particles of magnesium halide/alcohol adduct.

The obtained magnesium halide/alcohol adduct was of white spheric particles, having a molar ratio of ethanol to magnesium dichloride of 2.6. The particle size distribution measurement showed that: D10=18 μm, D50=33 μm, D90=50 μm and (D90−D10)/D50=0.97.

Example 2

The procedure as described in Example 1 was repeated, except that the rotation speed of the high-gravity rotary bed was regulated to 1200 rpm. The results are shown in Table 1.

Example 3

The procedure as described in Example 1 was repeated, except that the rotation speed of the high-gravity rotary bed was regulated to 2000 rpm. The results are shown in Table 1.

Example 4

The procedure as described in Example 1 was repeated, except that the rotation speed of the high-gravity rotary bed was regulated to 2500 rpm. The results are shown in Table 1.

Example 5

The procedure as described in Example 1 was repeated, except that the amount of ethanol was regulated to 13.6 kg. The results are shown in Table 1.

Example 6

The procedure as described in Example 1 was repeated, except that the amount of ethanol was regulated to 14.6 kg. The results are shown in Table 1.

Example 7

The procedure as described in Example 3 was repeated, except that the amount of ethanol was regulated to 14.6 kg. The results are shown in Table 1.

Example 8

The procedure as described in Example 4 was repeated, except that the amount of ethanol was regulated to 14.6 kg. The results are shown in Table 1.

Comparative Example 1

Particles of magnesium dichloride/alcohol adduct were prepared according to the procedure as described in the Example 1 of the Chinese Patent Application CN1330086A (high-speed stirring process), wherein the stirring speed in step (2) was 2000 rpm. The results are shown in Table 1.

TABLE 1

| Examples | Rotation speed of rotary bed (rpm) | $EtOH/MgCl_2$ (mol/mol) | D(10) (μm) | D(50) (μm) | D(90) (μm) | span |
|---|---|---|---|---|---|---|
| 1 | 1500 | 2.6 | 18 | 33 | 50 | 0.97 |
| 2 | 1200 | 2.6 | 21 | 42 | 64 | 1.02 |
| 3 | 2000 | 2.6 | 17 | 30 | 46 | 0.97 |
| 4 | 2500 | 2.6 | 14 | 26 | 41 | 1.04 |
| 5 | 1500 | 2.8 | 20 | 34 | 50 | 0.88 |
| 6 | 1500 | 3.0 | 19 | 32 | 47 | 0.87 |

TABLE 1-continued

| Examples | Rotation speed of rotary bed (rpm) | EtOH/$MgCl_2$ (mol/mol) | D(10) (μm) | D(50) (μm) | D(90) (μm) | span |
|---|---|---|---|---|---|---|
| 7 | 2000 | 3.0 | 16 | 28 | 42 | 0.93 |
| 8 | 2500 | 3.0 | 16 | 25 | 38 | 0.88 |
| Comparative Example 1 | — | 2.6 | 23 | 50 | 85 | 1.24 |

Notation: span = (D(90) − D(10))/D(50)

What is claimed is:

1. A process for preparing particles of magnesium halide/alcohol adduct, said process comprising the steps of:

(1) in an inert liquid medium, contacting a magnesium halide with an alcohol with heating to prepare a melt of magnesium halide/alcohol adduct;

(2) dispersing the mixture of the inert liquid medium and the melt of magnesium halide/alcohol adduct prepared in step (1) by rotation in a rotary bed reactor operated at a rotation speed of from 100 to 3000 rpm to obtain a dispersion of the melt of magnesium halide/alcohol adduct; and (3) cooling the dispersion of the melt prepared in step (2) to form the particles of magnesium halide/alcohol adduct.

2. A process for preparing particles of magnesium halide/alcohol adduct according to claim 1, characterized in that said magnesium halide is represented by a formula of $Mg(OR^1)_{2-m}X_m$, in which $R^1$ is $C_1$-$C_{14}$ hydrocarbyl, X is selected from the group consisting of F, Cl, Br and mixtures thereof, and m is 1 or 2; and said alcohol is represented by a formula of $R^2OH$, in which $R^2$ is alkyl, cycloalkyl or aryl, having from 1 to 12 carbon atoms.

3. A process for preparing particles of magnesium halide/alcohol adduct according to claim 1, characterized in that said magnesium halide is magnesium dichloride.

4. A process for preparing particles of magnesium halide/alcohol adduct according to claim 3, characterized in that molar ratio of said alcohol to said magnesium dichloride is in a range of from 2 to 6, so that the adduct is in solid state at room temperature, but can be molten at a temperature of from 100 to 135° C.

5. A process for preparing particles of magnesium halide/alcohol adduct according to claim 1, characterized in that said alcohol is at least one selected from the group consisting of methanol, ethanol, iso-propanol, n-butanol, iso-butanol, iso-pentanol, n-octanol, 2-ethyl-hexanol, ethylene glycol, propylene glycol, chloroethanol and trichloroethanol.

6. A process for preparing particles of magnesium halide/alcohol adduct according to claim 1, characterized in that said inert liquid medium comprises a liquid aliphatic hydrocarbon and optionally an organic silicon compound or a surfactant.

7. A process for preparing particles of magnesium halide/alcohol adduct according to claim 6, characterized in that the liquid aliphatic hydrocarbon is selected from the group consisting of kerosene, liquid paraffin, vaseline oil, and white oil.

8. A process for preparing particles of magnesium halide/alcohol adduct according to claim 1, characterized in that the step (1) is carried out under heating conditions, and the reaction temperature at the end of reaction is high enough to melt the magnesium halide/alcohol adduct.

9. A process for preparing particles of magnesium halide/alcohol adduct according to claim 1, characterized in that the rotary bed reactor is packed with corrugated gauze packing.

10. A process for preparing particles of magnesium halide/alcohol adduct according to claim 9, characterized in that the corrugated gauze packing has an average pore size of from 0.1 to 8 mm, a porosity of from 90 to 99 percent, a specific surface area of from 100 to 3000 $m^2/m^3$, and a wire diameter of from 0.05 to 0.5 mm.

11. A process for preparing particles of magnesium halide/alcohol adduct according to claim 1, characterized in that the step (1) is conducted at a temperature of from 90 to 150° C.

12. A process for preparing particles of magnesium halide/alcohol adduct, said process comprising the steps of:

(1) in an inert liquid medium selected from the group consisting of kerosene, liquid paraffin, vaseline oil, white oil, and mixtures thereof with a silicone oil, contacting magnesium dichloride with an alcohol selected from the group consisting of methanol, ethanol, iso-propanol, n-butanol, iso-butanol, iso-pentanol, n-octanol, 2-ethyl-hexanol, ethylene glycol, propylene glycol, chloroethanol, trichloroethanol and mixtures thereof with heating, to prepare a melt of magnesium dichloride/alcohol adduct;

(2) dispersing the mixture of the inert liquid medium and the melt of magnesium dichloride/alcohol adduct prepared in step (1) in a rotary bed reactor operated at a rotation speed of from 100 to 3000 rpm, to obtain a dispersion of the melt of magnesium dichloride/alcohol adduct; and (3) introducing the dispersion of the melt prepared in step (2) into a cooling medium pre-cooled to a temperature of from 0 to −60° C., to cool and solidify the particles of magnesium halide/alcohol adduct.

* * * * *